US008482558B2

(12) United States Patent
Morello et al.

(10) Patent No.: US 8,482,558 B2
(45) Date of Patent: Jul. 9, 2013

(54) SYSTEMS AND METHODS FOR COMPUTATIONAL DESIGN AND MODELING OF BUILDINGS

(75) Inventors: Frederick Morello, Johnstown, PA (US); Christopher Ryan March, Winchester, VA (US); Clifford B. Cantrell, White Post, VA (US)

(73) Assignee: M.I.C. Industries, Inc., Reston, VA (US)

( * ) Notice: Subject to any disclaimer, the term of this patent is extended or adjusted under 35 U.S.C. 154(b) by 1490 days.

(21) Appl. No.: 12/000,727

(22) Filed: Dec. 17, 2007

(65) Prior Publication Data

US 2009/0128558 A1    May 21, 2009

Related U.S. Application Data

(60) Provisional application No. 60/996,428, filed on Nov. 16, 2007.

(51) Int. Cl.
*G06T 17/00* (2006.01)
(52) U.S. Cl.
USPC .......................... 345/420; 345/418; 706/919
(58) Field of Classification Search
None
See application file for complete search history.

(56) References Cited

U.S. PATENT DOCUMENTS

| | | | |
|---|---|---|---|
| 5,510,066 A * | 4/1996 | Fink et al. ..................... 264/40.1 |
| 6,438,922 B1 * | 8/2002 | DeLeFevre .................. 52/741.1 |
| RE38,064 E | 4/2003 | Morello |
| 6,546,775 B2 | 4/2003 | Morello |
| 6,721,769 B1 * | 4/2004 | Rappaport et al. ............ 707/737 |
| 6,722,087 B1 | 4/2004 | Morello |
| 6,816,819 B1 | 11/2004 | Loveland |
| 6,836,752 B2 * | 12/2004 | Atasoy ............................. 703/1 |
| 6,912,489 B1 | 6/2005 | Luitwieler |
| 6,931,364 B1 * | 8/2005 | Anturna ........................... 703/1 |
| 6,985,832 B2 | 1/2006 | Saebi |
| 7,185,469 B2 | 3/2007 | Schaffeld |
| 7,292,908 B2 | 11/2007 | Borne et al. |
| 2003/0000156 A1 | 1/2003 | Morello et al. |
| 2003/0014223 A1 | 1/2003 | Phillips et al. |
| 2004/0181374 A1 | 9/2004 | Rappaport et al. |
| 2006/0080905 A1 | 4/2006 | Morello |
| 2007/0260432 A1 | 11/2007 | Okada |

OTHER PUBLICATIONS

International Search Report dated Jan. 15, 2009 from corresponding International Application No. PCT/US2008/012739.
Written Opinion of the International Searching Authority dated Jan. 15, 2009 from corresponding International Application No. PCT/US2008/012739.
M.I.C. Prosoft User Guide, M.I.C Industries, Inc., 2006, 312 pages.

* cited by examiner

Primary Examiner — Said Broome
(74) Attorney, Agent, or Firm — Jones Day

(57) ABSTRACT

A method and system generates a building design and a three-dimensional image thereof. First building information comprising a length, width, total height and wall height of a building is received via a first graphical user interface. If the length, width, total height, wall height, and a selectable building shape yield a valid set of building parameters, a design of said building is generated at a first software module, which is configured to generate the design, including wall portions and a roof portion, using minimum information consisting of the length, width, total height, wall height, and selectable building shape. A first image and a structural analysis of the design are generated. A second software module generates a second three-dimensional image of the building, which is different from the first image. A second graphical user interface permits a user to modify the second image to include predefined building elements.

39 Claims, 17 Drawing Sheets

Attributes

Name          Value

Sheets
Sheet
Size
Scale
Phone
Address1
Address2
Company
DWGNO
Rev
Subtitle
Drawing Title
Project Title

[ Cancel ] [ Continue ]

[ Save and Continue ]

FIG. 8

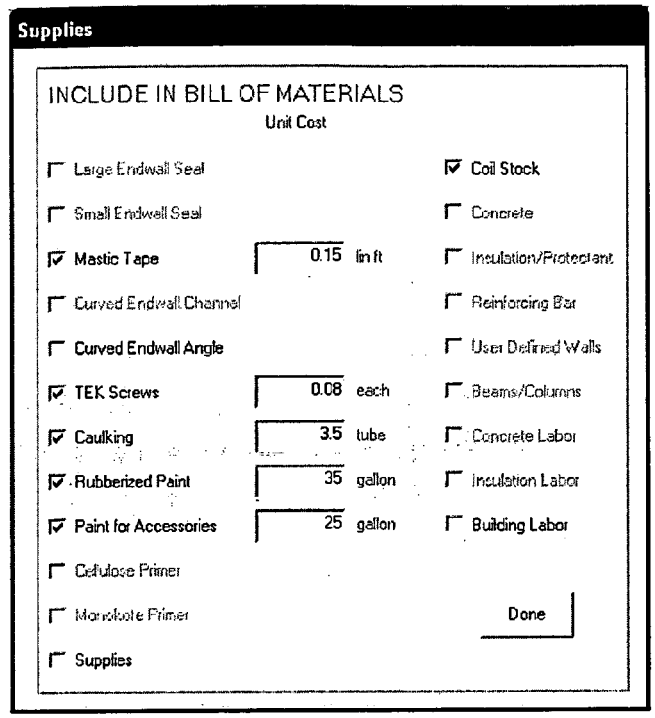

FIG. 12

| Item | Description | Units | Quantity | Unit Cost | Total Cost | Cost per sq ft |
|---|---|---|---|---|---|---|
| Roof Steel | Steel for Roof with Scrap, 0.033 in | tons | 2.20 | 1300.00 | 2861.71 | 3.31 |
| End Wall Steel | Endwall Steel with Scrap, 0.033 in | tons | 0.83 | 1300.00 | 1073.21 | 1.24 |
| Personnel Door | Door Number 1 - 36 x 84 in | each | 1 | 125 | 125 | 0.14 |
| Door Frame | Door Frame Number 1 | lin ft | 17 | 1.75 | 30 | 0.03 |
| Window | Window Number 1 - 24 x 36 in | each | 1 | 95 | 95 | 0.11 |
| Window Frame | Window Frame Number 1 | lin ft | 10 | 1.75 | 18 | 0.02 |
| Window | Window Number 2 - 24 x 24 in | each | 1 | 90 | 90 | 0.10 |
| Window Frame | Window Frame Number 2 | lin ft | 8 | 1.75 | 14 | 0.02 |
| Overhead Door | Overhead Door 1 - 12 x 14 ft | each | 1 | 4500 | 4500 | 5.21 |
| Overhead Door Frame | OH Frame, Square Tube x 4 in | lin ft | 42 | 9.25 | 389 | 0.45 |
| Ventilators | Ventilator size - (10 in dia) 475 | cfm | 4 | 150 | 600 | 0.69 |
| Ventilator Frame | Fabricated Ventilator Frame | each | 4 | 17 | 68 | 0.08 |
| Intake Louver | Louver size - (12 x 24 in) 2 | sqft | 2 | 175 | 350 | 0.41 |
| Intake Frame | Fabricated Intake Louver Frame | each | 2 | 25 | 50 | 0.06 |
| Skylights | Skylight size - 12 x 36 | in | 1 | 10 | 30 | 0.03 |
| Base Angle | Size - L 3 x 3 x 3/16" Steel | lin ft | 120 | 1.3 | 156 | 0.18 |
| Mastic Tape | Mastic Tape 1/8 in x 1 in | lin ft | 215 | 0.15 | 32 | 0.04 |
| Self-Drilling Tek Screws | Tek Screws #12 - 14 x 1-1/4 in | each | 484 | 0.08 | 39 | 0.04 |
| Caulking | Caulking Cartridge (Tube) x 10.1 oz | tube | 7 | 3.5 | 24 | 0.03 |
| Frame Paint | One Gallon Unit of Frame Paint | gallon | 2 | 25 | 45 | 0.05 |
| Rubberized Paint | One Gallon Unit of Rubberized Paint | gallon | 1 | 35 | 34 | 0.04 |
| Totals | | | | | 10657.92 | 12.32 |

FIG. 13

SYSTEMS AND METHODS FOR COMPUTATIONAL DESIGN AND MODELING OF BUILDINGS

CROSS-REFERENCE TO RELATED APPLICATIONS

This application claims priority to U.S. Provisional Patent Application No. 60/996,428 entitled "Method and System for Computation and Modeling Specialized Metal Buildings" filed on Nov. 16, 2007, the entire contents of which are incorporated herein by reference.

FIELD OF THE DISCLOSURE

This disclosure relates to computational design and modeling, and more particularly to systems and methods for computational design and modeling of buildings.

BACKGROUND INFORMATION

Presently, there are software packages that facilitate building design in the construction industry. Such software packages can produce architectural renderings or perform a structural analysis or generate two-dimensional drawings. Such software packages are generally limited in functionality and designed for a single purpose, and building designers often need to purchase multiple software packages for each of the different stages of design. Individual software packages are typically used by different users in the construction industry (e.g., the draftsman, the engineer, or the architect).

The present inventors have observed a need for systems for generating detailed three dimensional architectural building designs and for rendering two-dimensional and three-dimensional drawings of the same (such as for a self supporting circular type, double-radius type, gable type or other clear-span type steel shell buildings, for example). It would be desirable for such systems to automatically do the work of the engineer, the architect and the draftsperson in a single, easy to use package that can operate with a minimal input of building information.

SUMMARY

It is an object of the present invention to provide systems and methods that can accept minimal information (e.g., data such as building width, length, total height, wall height, and selectable building shape) and generate a three-dimensional design of the desired building. The model may be a comprehensive three-dimensional design which can be rotated, edited, and rendered and may include details relating to structural features of building panels (e.g., sheet metal thickness and yield strength), foundation designs, flooring, windows and doors, for example. The systems and methods may also provide suitable views, schedules and engineering documents for approval for the building design.

According to an exemplary embodiment, a computer-assisted method is described for automatically generating a design for a building that comprises structurally supportive building panels of sheet material, at least some of said building panels including curved sections, and for generating a three-dimensional image of said design. The method comprises: receiving first building information via a first graphical user interface of a computer, said first building information comprising a length, a width, a total height and a wall height of a building to be designed; determining whether said length, said width, said total height, said wall height, and a selectable building shape comprising at least one curved portion yield a valid set of building parameters, said selectable building shape being either computer-specified or user-specified; if the set of building parameters is valid, generating with a first software module at said computer a design of said building, wherein said first software module is configured to generate said design of said building, including wall portions and a roof portion, using minimum information consisting of said length, said width, said total height, said wall height, and said selectable building shape; generating a first image of said design; performing a structural analysis of said design; determining whether said structural analysis satisfies one or more requirements; communicating said length, said width, said total height, said wall height, and said selectable building shape to a second software module at said computer; generating a second three-dimensional image of said building using said second software module, the second three-dimensional image being different from the first image; and displaying said second three-dimensional image at a second graphical user interface at said computer, said second user interface configured to permit a user to modify said three-dimensional image to include one or more predefined building elements. A system comprising a processing system and a memory can carry out the method. An article of manufacture comprising a computer readable medium that comprises computer readable program code embodied therein can cause a processing system to carry out the method.

According to another exemplary embodiment, a computer-assisted method is described for automatically generating a design for a building comprising structurally supportive building panels of sheet material, at least some of said building panels including curved sections, and for generating a three-dimensional image of said design. The method comprises: receiving first building information via a graphical user interface of a computer, said first building information comprising a length, a width, a total height and a wall height of a building to be designed; determining whether said length, said width, said total height, said wall height, and a selectable building shape comprising at least one curved portion yield a valid set of building parameters, said selectable building shape being either computer-specified or user-specified; if the set of building parameters is valid, generating with a software module at said computer a design of said building, wherein said software module is configured to generate said design of said building, including wall portions and a roof portion, using minimum information consisting of said length, said width, said total height, said wall height, and said selectable building shape; generating a three-dimensional image of said design; performing a structural analysis of said design; determining whether said structural analysis satisfies one or more requirements; receiving at the graphical user interface of said computer an input specifying a position of a support member to be suspended from the roof portion, said position being expressed in terms of a lateral distance from a predetermined location on said roof portion, said roof portion including a curved portion between said predetermined location and said position; determining a placement location at which to place said support member on a panel of said roof portion wherein said placement location is expressed in terms of a distance along said roof panel taking into account said curved portion of said roof portion; and outputting said placement location at said graphical user interface. A system comprising a processing system and a memory can carry out the method. An article of manufacture comprising a computer readable medium that comprises computer readable program code embodied therein can cause a processing system to carry out the method.

BRIEF DESCRIPTION OF THE DRAWINGS

FIG. 8 is a representation of an exemplary window of a graphical user interface for inputting information for determining placement locations for support members (tabs) according to an exemplary embodiment.

FIG. 12 is a representation of an exemplary window of a graphical user interface for selecting items to be included in a bill of materials for a building design according to an exemplary embodiment.

FIG. 13 is a representation of an exemplary window of a graphical user interface illustrating a bill of materials for a building design according to an exemplary embodiment.

DETAILED DESCRIPTION OF EXEMPLARY EMBODIMENTS

Exemplary methods and systems are described herein for designing buildings that comprise structurally supportive building panels of sheet material (e.g., galvanized steel sheet or other types of sheet metals) and that possess roofs having at least some curved sections. Such buildings generally have self-supporting wall and roof structures and may be referred to as clear-span buildings insofar as they do not require structural support posts and beams that might otherwise obstruct useable interior space. Typical shapes for such buildings may include, for example, those with circularly shaped roof portions with or without straight side walls (e.g., the curved roof portion may extend to the building foundation or may be supported by straight, vertical side walls), those with double-radius style roof portions wherein a central portion of the roof possesses one radius of curvature and wherein curved portions of the roof near side walls of the building possess another radius of curvature (eave radius), and those with a gable style roof wherein a curved apex of the roof (having a crown radius) meets straight roof portions that meet additional curved roof portions (having an eave radius) near side walls of the building. Exemplary geometries for building panels that can be used to make such buildings and exemplary panel crimping machines for generating such building panels and for attaching them together are described, for example, in commonly owned U.S. Pat. Nos. 6,722,087, 6,546,775, and RE38,064, and U.S. Patent Application Publication Nos. 20030000156 and 20060080905, but are not limited thereto.

Figure 1:
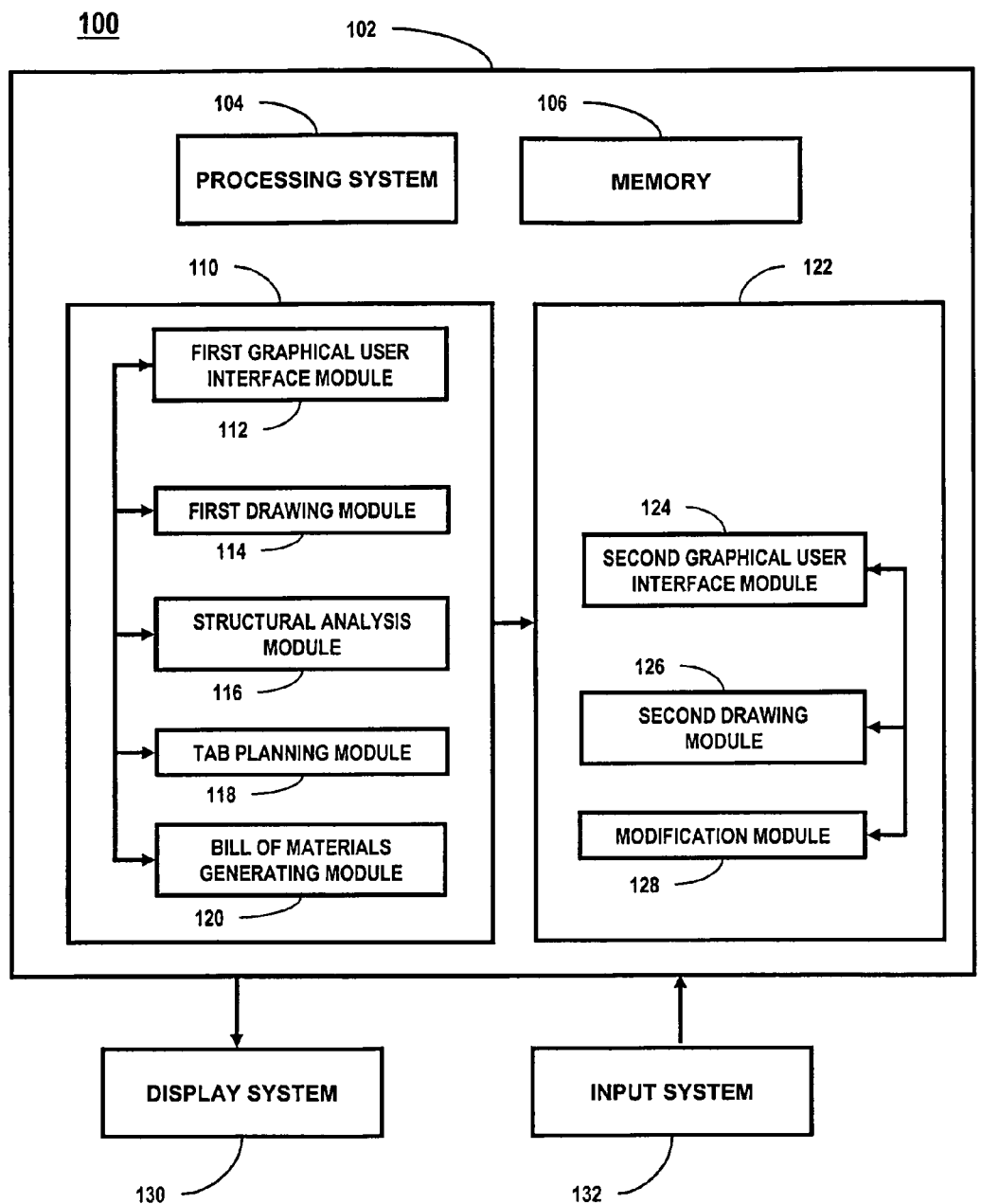
FIG. 1 is a schematic representation of an exemplary computer system for performing methods for generating building designs to exemplary embodiments.

Referring to the drawings, FIG. 1 illustrates an exemplary system 100 that can perform the methods described herein for designing buildings that comprise structurally supportive building panels of sheet material. The system 100 includes a computer system 102 that includes a processing system 104 and a memory 106 coupled to the processing system. The processing system may comprise one or more processing units of any suitable type, such as those commonly found in personal computer systems, and/or any suitable specialized processors. The processing system may be configured in a single computer system or may be distributed among multiple computer systems that can communicate via any suitable network such as the Internet using appropriate communications hardware. The memory 106 can be any suitable computer memory. The computer system 102 can read any suitable computer readable medium such as a magnetic hard disk, an optical disk (e.g., compact disc or DVD), flash memory, a memory stick, random access memory (RAM), read only memory (ROM), or any other suitable memory, wherein the computer readable medium may include computer readable program code adapted to cause the processing system 104 to carry out methods described herein. The system 100 may also include any suitable display system, such as a computer monitor, and any suitable input system 132, such as a keyboard and computer mouse, to permit a user to interact with the computer system 102.

The computer system 102 may utilize a first software module 110 and optionally a second software module 122. For ease of description, the first software module 110 may include a first graphical user interface (GUI) module 112 for generating a first graphical user interface comprising a hierarchy of windows or pages that may be displayed on display system 130 and navigated by a user using the input system 132. The first software module 110 may also include a first drawing module 114, a structural analysis module 116, a support member planning module 118 (also referred to herein as a tab planner), and a bill of materials generating module 120. The second software module 122 may include a second GUI module 124 for generating a second graphical user interface comprising a hierarchy of windows or pages that may be displayed on display system 130 and navigated by a user using the input system 13. The second software module 122 may also include a second drawing module 126 and a modification module 128. The functionality of these various modules will be discussed further herein in connection with various flow charts, and it should be understood that the identification of the various modules according to function is merely exemplary and intended to facilitate the description, and should not be interpreted as being limiting in any way.

Figure 2:
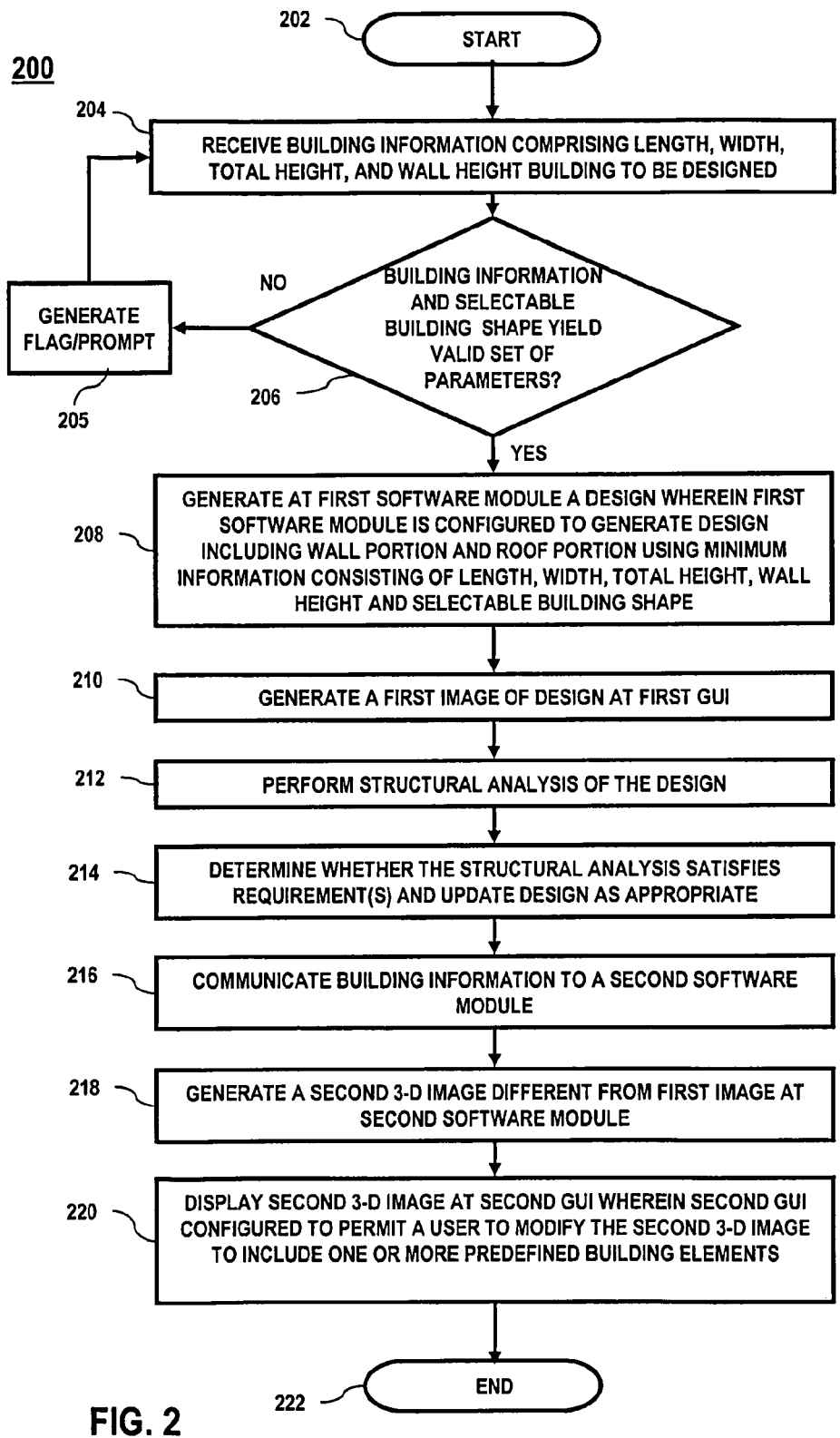
FIG. 2 is a flow chart of an exemplary approach for generating a three-dimensional design of a building according to an exemplary embodiment.
Figure 3A:
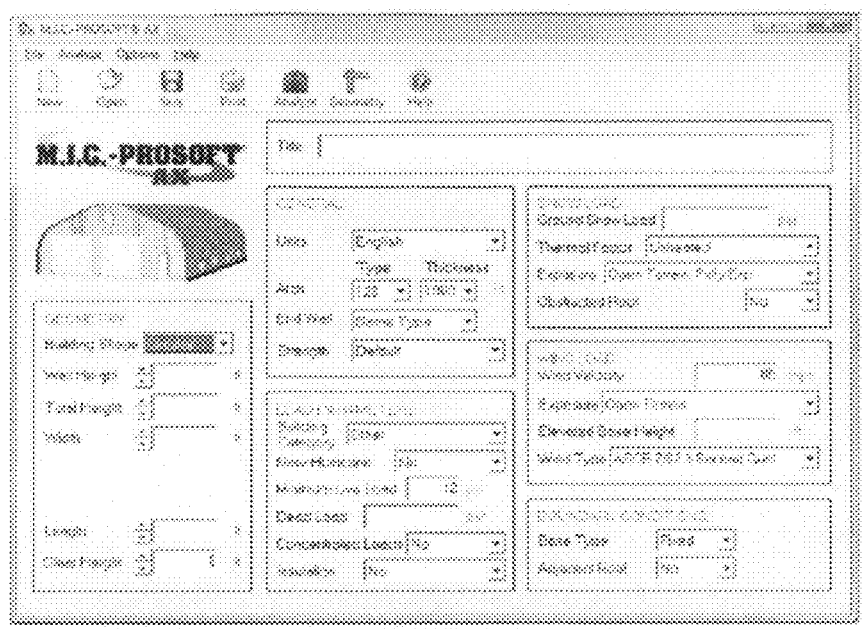
FIG. 3a is a representation of an exemplary window of a graphical user interface for inputting building information according to an exemplary embodiment.
Figure 3B:
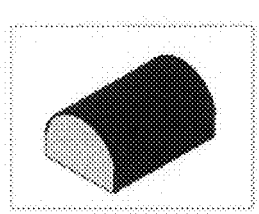
FIGS. 3b-3d are representations of exemplary windows of a graphical user interfaces for inputting building information according to exemplary embodiments.

FIG. 2 is a flow chart illustrating an exemplary approach 200 for generating a three-dimensional design of a building according to an exemplary embodiment. The process starts at step 202. At step 204, building information is received at a first GUI of the system 100, e.g., provided via user input using the input system 132 in connection with a suitable window or windows of the first GUI displayed on the display system 130. The building information may comprise a length, a width, a total height and a wall height of a building to be designed. For example, FIG. 3a is a representation of an exemplary window of the first GUI for inputting the building information according to an exemplary embodiment. The first GUI may display a default building shape (e.g., circular such as illustrated in FIG. 3b), and may permit the user to select a different building shape (e.g., a double radius shape shown in FIG. 3c or a gable shape shown in FIG. 3d, for example). As shown in FIG. 3a, the graphical user interface may include a window that allows the user to input and view various information relating to the geometry of a building to be designed such as, for example, the units for the design, the building shape, the arch type of the building panels (e.g., specified with a numerical manufacturer designation, such as "120" for a 12 inch wide curved panel or "240" for a 24 inch wide curved panel, or other designation), the thickness of the sheet material, the end wall information, and strength and load parameters related to the building (e.g., a building category, proximity to a hurricane, minimum live load, dead load, concentrated loads, and insulation). Generally, the thickness in the "General" portion of the GUI window is set to a default of zero, in which case the software module will determine a suitable thickness of the sheet material as described elsewhere herein. If the user specifies a thickness, that specification will take precedence, and the thickness of the sheet material will be set to the user value. Additionally, the graphical user interface may include portions that allow the user to view and/or input load information such as snow load information (e.g., ground snow load, thermal factor, exposure, and obstructed roof), wind load information (e.g., wind velocity, exposure, elevated base height, and wind type), and boundary conditions (e.g., base type and adjacent roof). Although FIG. 3a illustrates a variety of parameters related to the building design, the first software module 110 of the computer system 102 can be configured to generate a building design with minimal information consisting of a length, a width, a total height, a wall height of a building to be designed, and building shape (which can be a computer-specified shape via a default setting, or a user-specified shape via a user selection at the first GUI).

Figure 3C:
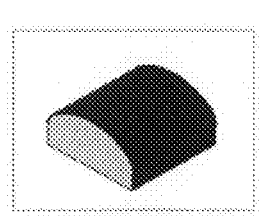
Figure 3D:
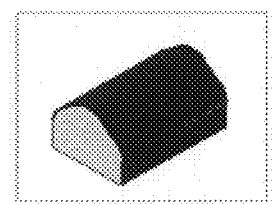

FIGS. 3b-3d illustrate representations of additional windows of the first GUI that can be navigated by a user for inputting building information according to exemplary embodiments. FIG. 3b illustrates an exemplary GUI window for inputting information for designing a building with a circular roof. The first software module can generate a building design using minimum information of a wall height (of side walls), a total height (at the apex of the roof), a building width, a building length, and the building shape (circular in the example of FIG. 3b). Although clear height (described below) is shown as a user selectable input, it is not required to design the building. FIG. 3c illustrates an exemplary GUI window for inputting information to design a building with a double radius roof (shown as 2-radius). As shown in FIG. 3b, the selectable building shape information may also include an eave radius, but this information is not necessary for the first software module to generate a building a design. FIG. 3d illustrates an exemplary GUI window for inputting information to design a building with a gable roof. As shown in FIG. 3d, the selectable building shape information may include an eave radius and a crown radius. As would be understood by a person of ordinary skill in the art, the eave radius is the radius of a bend at the lower sides of the roof (near the eaves), and the crown radius is the radius of the bend on the top (apex) of the roof.

Figure 3E:
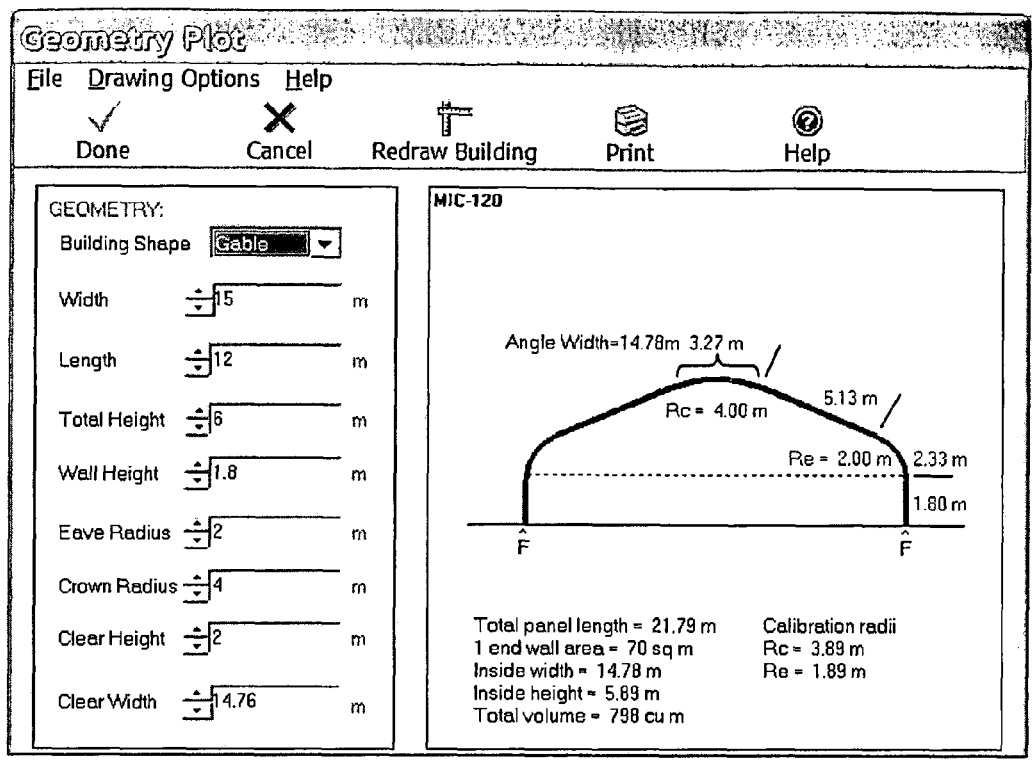
FIG. 3e shows an exemplary window of the first GUI with an illustration in two dimensions of an exemplary gable style building and associated design parameters.

FIG. 3e shows an exemplary window of the first GUI for a geometry plot function with an illustration of a first image in two dimensions of an exemplary gable style building and associated design parameters. The first software module 110 is capable of generating such two-dimensional drawings as well as three-dimensional drawings. In this example, the width is 15 meters, the length is 12 meters, the total height is 6 meters, the wall height is 1.8 meters, the eave radius is 2 meters, the crown radius is 4 meters, the clear height is 2 meters, and the clear width is 14.76 meters. Whereas the image is illustrated in two dimensions, the software could be configured to display the first image in a three dimensional view if desired. The clear height is a user specified parameter for a desired height of a building component, such as the opening height of a door. Where the user specifies a clear height, the first software module 110 can generate and display at the geometry plot GUI window a corresponding calculated clear width, which identifies the horizontal range over which the object of the specified clear height can be positioned. In the example of FIG. 3e, for instance, the user-specified clear height of 2 meters results in a determined clear width of 14.76 meters for this example, the clear width being further indicated on the two dimensional illustration of FIG. 3e by the horizontal dotted line.

Returning to FIG. 2, at step 206, the first software module determines whether the length, the width, the total height, the wall height, and a selectable building shape comprising at least one curved portion yields a valid set of building parameters. The selectable building shape can be either computer-specified (e.g., a default setting) or user-specified via user selection of a shape field by clicking on a drop down menu of a GUI window. For example, if the wall height (of the side walls) is specified as being greater than the total height, the first software module determines that the combination of building parameters is not valid, since the total height cannot be less than the wall height of the side walls. At step 205, the process generates a flag indicating that the parameters are not valid and prompts the user to make an adjustment. The process returns to step 204.

If the parameters are valid, the process continues to step 208 where the first software module generates a design of the building including wall portions and a roof portion. In generating the design, the first software module can assume starting values for the thickness (gauge) of sheet metal to be used for constructing the building panels and the yield strength of the sheet metal. For example, a lower bound for a thickness of sheet metal for the building panels and a lower bound for the yield strength of a given type of sheet metal (e.g., galvanized steel of a particular type and heat treatment) can be programmed into software by the software manufacturer based upon conventional building requirements and based upon experience in connection with buildings of given designs. The software module can be configured to generate the building design using minimum information consisting of the length, the width, the total height, the wall height, and the selectable building shape. Of course, more information than this can be specified by the user, but it is advantageous for the software module to be capable of generating the building design based upon this minimum information. As a practical matter, such a building design may not be a final design depending upon what a structural analysis (described below) reveals. At step 210, a first image of the design is generated displayed at the display system 130.

At step 212, calculations for structural analysis of the design are performed. For example, the first software module can automatically generate a finite element model of the building design using a suitable finite element frame and boundary conditions, and can solve the model for the structural characteristics of the building. In particular, the first software module solves the finite element model considering weight of the building itself (the building's own load) and optionally considering any user specified additional loads, such as snow load and wind load. Finite element modeling is well known in the art, and carrying suitable programming to generate appropriate finite element models is within the purview of one of ordinary skill in the art. At step 114, the first software module 110 determines whether the structural analysis satisfies one or more requirements, such as, for example, whether the yield strength of the sheet metal at any section of the building is exceeded by the inherent load and any additional loads. If requirements are not satisfied, the building design is updated.

Figure 4:
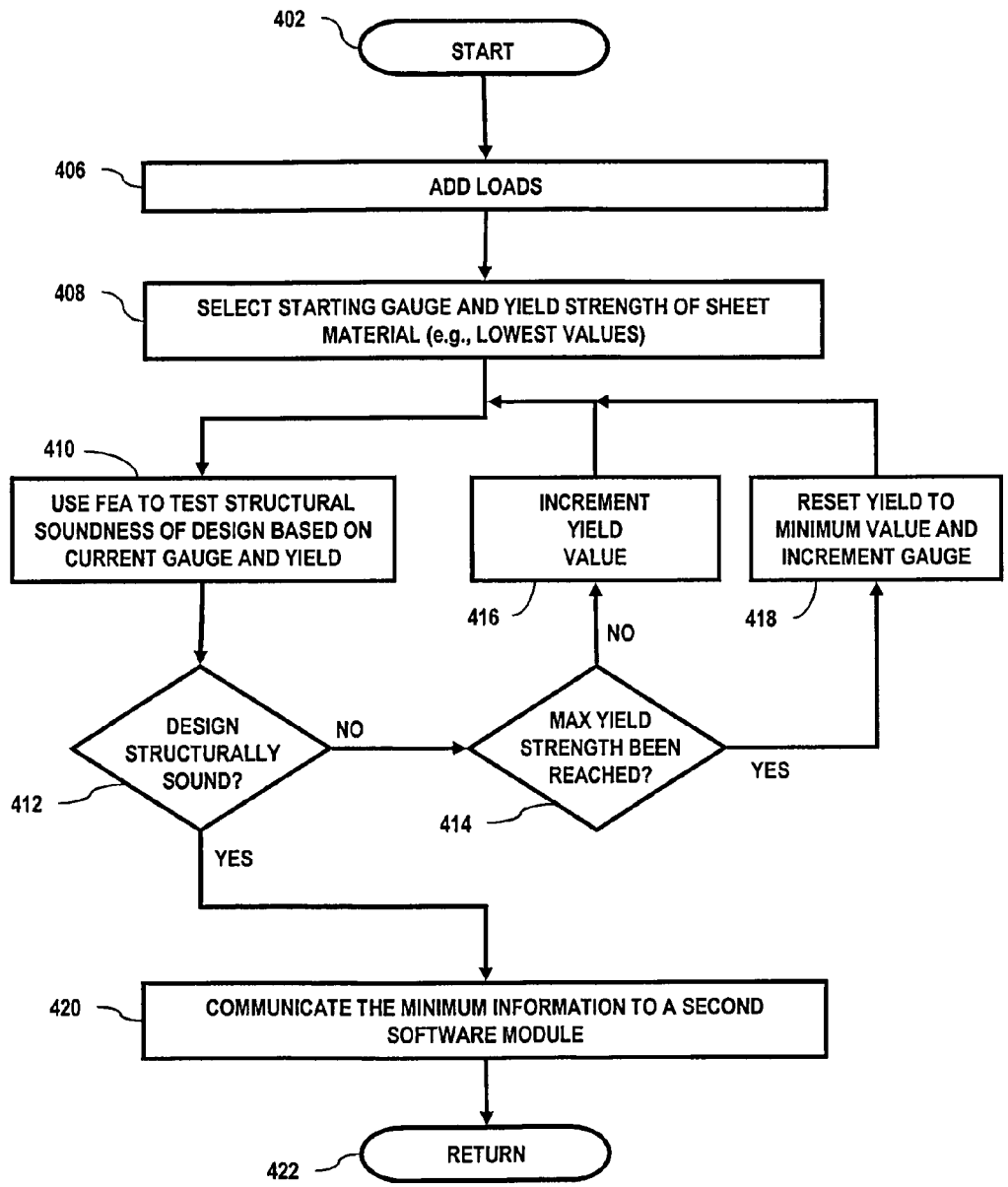
FIG. 4 is a flow chart illustrating an exemplary approach for performing a structural analysis of a building design according to an exemplary embodiment.

An exemplary approach for carrying out steps 212 and 214 of FIG. 2 is shown in the flow diagram of FIG. 4. Referring to the exemplary approach 400 illustrated FIG. 4, a finite element structural analysis starts at step 402. At step 406, various loads may be added to the design. The loads may be computer specified (e.g., default loads may be assumed) or user specified (e.g., as described with respect to FIG. 3a). Exemplary loads may include external loads such as, for example, snow, rain, and/or wind. Next, at step 408, the process selects starting parameters to perform the structural analysis. For example, for a building to be fabricated from sheet, the parameters may include a gauge (thickness) of the steel sheet and a yield strength of the steel sheet. Various types of steel sheet having various yield strengths may be available depending upon the composition of the material and its heat treatment, and these may be available in a variety of gauges. In the example of FIG. 4, the process begins with selections of the lowest values for the yield strength and gauge that have been programmed into the software. At step 410, a finite element analysis is performed based on the selected parameters to determine structural characteristics of the building design, such as the load experienced at the various sections of the building and the yield strength at various sections of the building given the material properties of the sheet material used as well as the cross-sectional shape of the building panels and the orientation of the building panels.

At step 412, the first software module determines whether the design, based on the selected parameters, is structurally sound. This determination can be made based upon parameters and loads as described above and further in view of any applicable building codes and standards, such as the AISI (American Iron and Steel Institute) Cold Formed Steel Design Manual 1996 edition and 1999 supplement, the ASCE Standard No. 7-05 for Minimum Design Loads for Buildings and Other Structures, ASCE/SEI 7-05 (American Society of Civil Engineers), which are well known to those of ordinary skill in the art. Requirements from such standards can be programmed into software in any suitable way (e.g., in the form of look-up tables, applicable equations, etc.), and such programming is within the purview of one of ordinary skill in the art. Of course, the software could be configured to provide for additional safety margins, if desired. To the extent it may be desirable to perform structural modeling of a concrete foundation for a given building design, a structural analysis can further include be based upon the ACI-318-99 Building Codes for Structural Concrete (American Concrete Institute), which is well known to those of ordinary skill in the art. It will be appreciated that foundation design (e.g., thickness and width of concrete footers) will depend not only upon the size and weight of the building supported but also upon the type of soil or ground on which the foundation is constructed.

If it is determined at step 412 that the design is not structurally sound, the process continues to step 414 where it is determined whether the maximum yield strength of the sheet material (for that particular gauge) has been reached. If not, the yield strength value is incremented at step 416 and the process returns to step 410, and finite element analysis is used again to test the structural soundness of the design. If it is determined at step 412 that the design is still not structurally sound, the process proceeds again to step 414. If it is determined at step 414 that the maximum yield strength has been reached, the process at step 418 resets the yield value to a minimum value and increments the gauge of the sheet material at step 418 to a next high value (greater thickness). The process returns to step 410 for a new structural analysis of the modified design. In this manner, the finite element analysis is performed iteratively, increasing yield strength and gauge of the sheet material as needed, until a structurally sound design is achieved. Both gauge and yield are adjusted in the example of FIG. 4, but it will be readily apparent that the design modification could be performed by adjusting only one of these parameters (e.g., gauge) until an acceptable design is achieved. Once a structurally sound design is achieved, the process continues to step 420, at which point the process returns to step 216 of FIG. 2. In some embodiments, the structural analysis does not consider any structural benefit that may arise from the end walls of the building. For example, in some embodiments, the structural analysis may be performed taking into account only the side walls and roof portions, which are substantially self supporting, and may ignore the end walls for any structural support.

Figure 5:
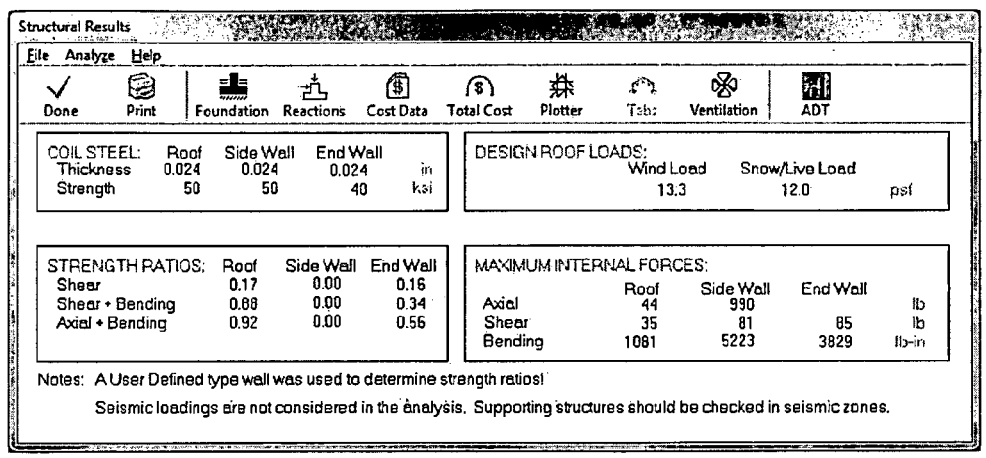
FIG. 5 is a representation of an exemplary window of a graphical user interface showing results generated from a structural analysis according to an exemplary embodiment.

If desired, a GUI window showing the results of the structural analysis may be displayed. FIG. 5 is an exemplary representation of results generated from the structural analysis described with respect to FIG. 4 according to an exemplary embodiment. As shown in FIG. 5, the results window can report the thickness (gauge) and strength for each of the roof, sidewall, and end wall of the building. In addition the strength ratios, including shear, shear+bending, and axial+bending and maximum internal forces (axial, shear, and bending) can also be identified. The external loads can also be presented to the user (e.g., wind load and snow/live load).

Returning to FIG. 2, at step 216, now that a structurally sound design has been generated, building information comprising the length, width, total height, wall height, and selectable building shape can be communicated to a second software module 122 (see FIG. 1) at the computer for visualization and modification of the building design (i.e., the minimum building information required to generate the building design can be communicated to a second software module). At step 218, the second software module 122 generates a second three-dimensional image of the building based upon the information it receives. The second three-dimensional image is different from the first image insofar as it is generated by a different software module and is a three dimensional representation whereas the first image may be only two dimensional. The second software module need not receive and process the actual building design generated by the first software module 110 including full structural data since the second software module 122 may be configured for the purpose of adding other predefined building elements that may not significantly affect the structural soundness of the building design. Thus, at step 220, the second three-dimensional image is displayed at a second graphical user interface at the computer, and the second user interface may be configured to permit a user to modify the three-dimensional image to include one or more predefined building elements. In exemplary embodiments the predefined building elements may comprise plumbing components, electrical components, doors (e.g., bifold doubles, bifold singles, cased openings, hinged doubles, hinged singles, overhead sectionals, pocket singles, revolving simples, or sliding doubles), and windows (e.g., awnings, casements, casement doubles, double hung, gliders, hoppers, pass through, pictures, picture-arcs, or horizontal pivots). Such modifications can be accomplished using the input system 132 (FIG. 1) and the second graphical user interface displayed on the display system 130 by suitably selecting, dragging and dropping desired types of doors, windows and/or other components from palettes or menus of available options. Such drag and drop techniques are well known in the art and can be suitably programmed by one of ordinary skill in the art. Moreover, suitable programming to permit the modification of the second three dimensional image of the building at the second graphical user interface is within the purview of one of ordinary skill in the art. In fact, conventional software packages, such as Architectural Desktop®, can be used for the second software module and can be suitably accessed by the first software module for such modification purposes.

As noted above, the first GUI may include a hierarchy of windows that a user can navigate in a conventional manner by pointing and clicking on appropriate menus. For example the GUI may include windows for STRUCTURAL RESULTS, FOUNDATION DESIGN, and STRUCTURE COST AND MATERIAL SUMMARY. Each of these windows may include a launch icon on their respective toolbars that, when selected (e.g., by clicking) will launch the second software module (e.g., another commercial software package such as Autodesk's Architectural Desktop computer aided design software) for further visualization of the building design and modification to include other predefined building elements like windows, doors, electrical features and plumbing features, for example.

Figures 6A, 6B:
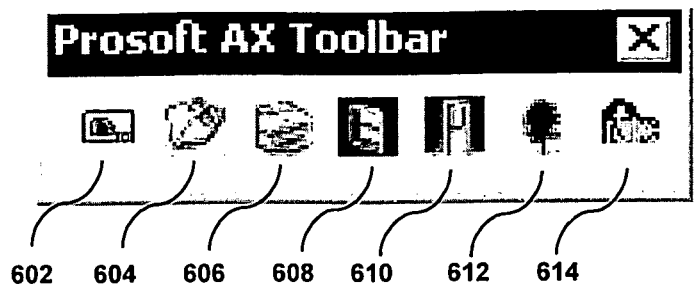
FIG. 6a illustrates an exemplary toolbar for navigating commonly used features of the second software module according to an exemplary embodiment.
FIGS. 6b-6f illustrate exemplary windows of the second graphical user interface of the second software module according to exemplary embodiments.
Figure 6C:
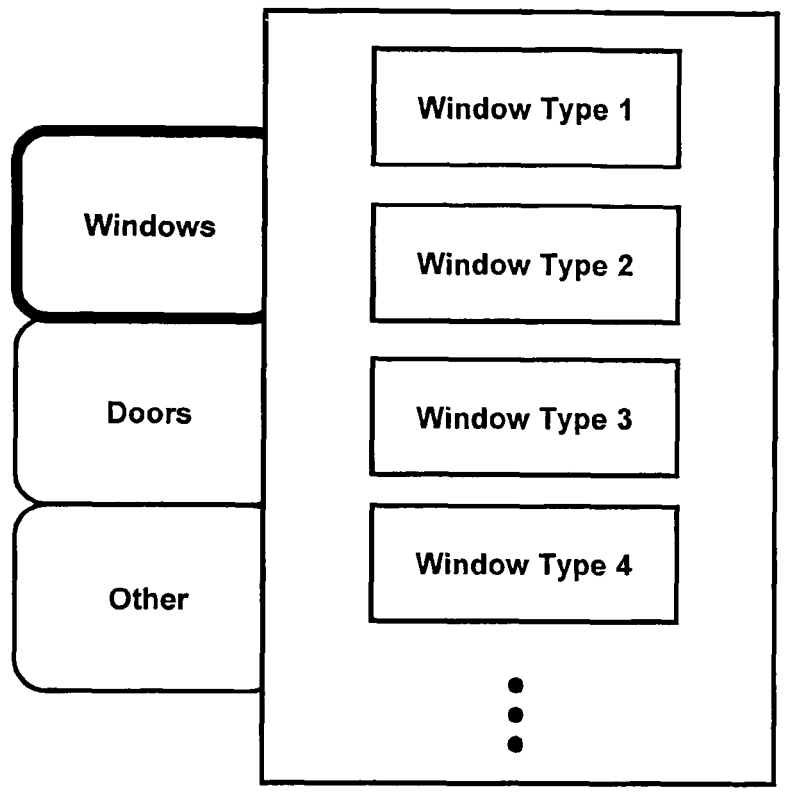
Figure 6D:
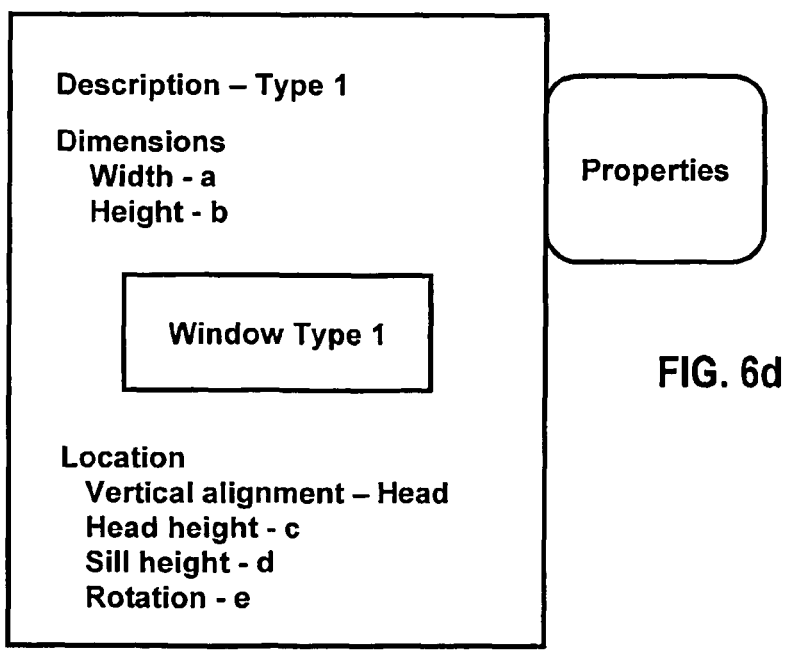
Figure 6E:
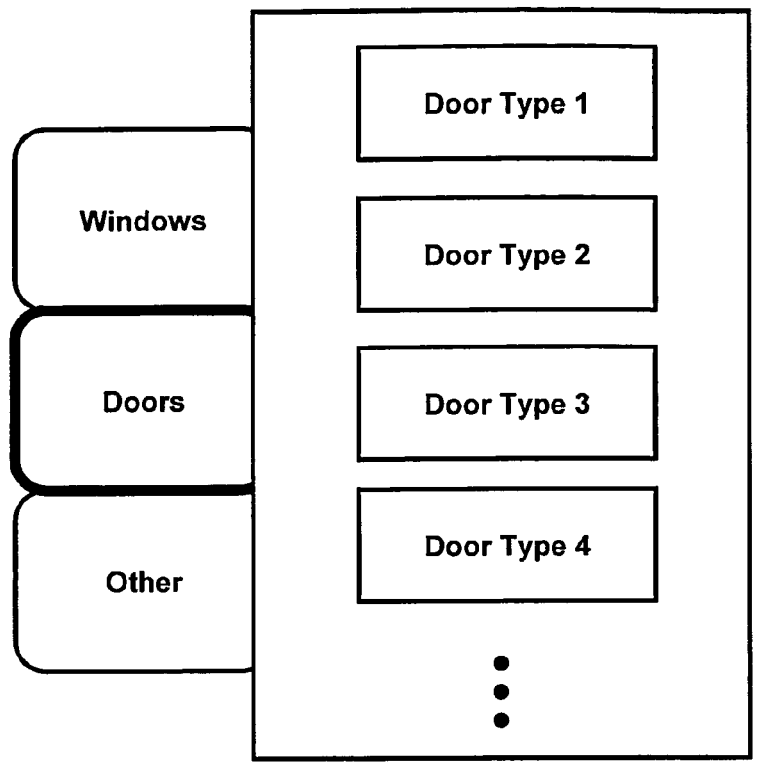
Figure 6F:
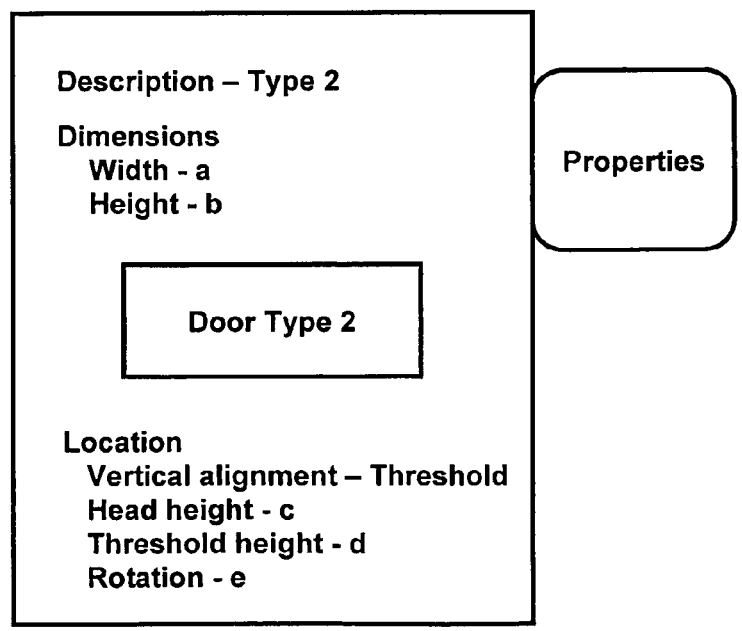

The second software model generates a three-dimensional image of the building design including the roof portion, side wall portions, and end walls. Other features that were selected in a BILL OF MATERIALS window can also be drawn. If the building design included a foundation, solids representing a spread or grade beam can be drawn around the base of the building, and curbing (to support steel walls of the building design) can be drawn on top of the foundation. Also, a concrete slab can be drawn if a slab thickness was set in the MATERIAL & LABOR COSTS AND PRODUCTIVITY window. The first software module can be configured to generate a first toolbar such as shown in FIG. 6a (PROSOFT AX TOOLBAR) which can make some of the most commonly used features in the second software module easily accessible. For example, the first toolbar of the second software module (e.g., PROSOFT AX TOOLBAR) may contain a collection of buttons which easily provide functionality to the user for common tasks carried out in the second software module. As an example, the main toolbar shown in FIG. 6a has seven (7) buttons. In this example, the first button 602 "Generate Drawings" can generate paper drawings of the 3D design using the second software module. Such drawings can include a title page, a floor plan, elevations, window and door schedules, foundation flan and details, and end wall cutlist. The second button 604 "Open Drawing" opens an existing drawing to generate further drawings, plots, or to add features using the second software module. The third button 606 "Plot Drawings" plots all paper-space drawings using the second software module. The fourth button 608 "Insert Window" inserts a window into a wall using the second software module. The fifth button 610 "Insert Door" inserts a door into a wall using the second software module. The sixth button 612 "Add Landscape" inserts a selectable landscape object into the design using the second software module. The seventh button 614 "Return" can optionally close the second software module and return the user to the first software module.

Further, clicking on the first button 602 "Generate Drawings" can load an ATTRIBUTES window, such as shown in FIG. 6b, which enables a user to edit title and other identifying information before paper drawings are generated.

Selecting the OPEN DRAWING toolbar button 604 loads an existing drawing in a readable format of the second software module, permitting the user to make further drawings for the opened drawing, plot them, and add windows, doors, and landscape objects, for example. Selecting the PLOT DRAWINGS toolbar button 606 plots each current layout drawing using the default printer specified.

Selecting the INSERT WINDOW toolbar button 608 opens a "windows" tab of a tool palette of the second GUI of the second software module. Once the windows tab is open, the user can select the type of window desired for placement in a wall. The user is presented with a PROPERTIES window, and a command line can prompt a user to select a wall on which to place the window. The properties window also displays information regarding position and dimensions of the window type selected. To place the desired window in a wall, the user can select the wall for insertion of the window. A representation of the window appears, and the user can place the window with movement of a computer mouse.

Clicking on the INSERT DOOR toolbar button 610 opens the "doors" tab of a TOOL PALETTES window. Once the doors tab is open, the user can select the type of door desired for placement in a wall. The user can then be prompted with a PROPERTIES window, and a command line can prompt a user to select a wall on which to place the door. The properties window also displays information regarding position and dimensions of the door type selected. To place the desired door in a wall, the user can select the wall for insertion of the door. A representation of the door appears, and user can place the door with movement of a computer mouse. Similarly, clicking on ADD LANDSCAPE toolbar button 612 permits the user to select a type of landscape element and place it at the building design with the computer mouse.

Figure 7:
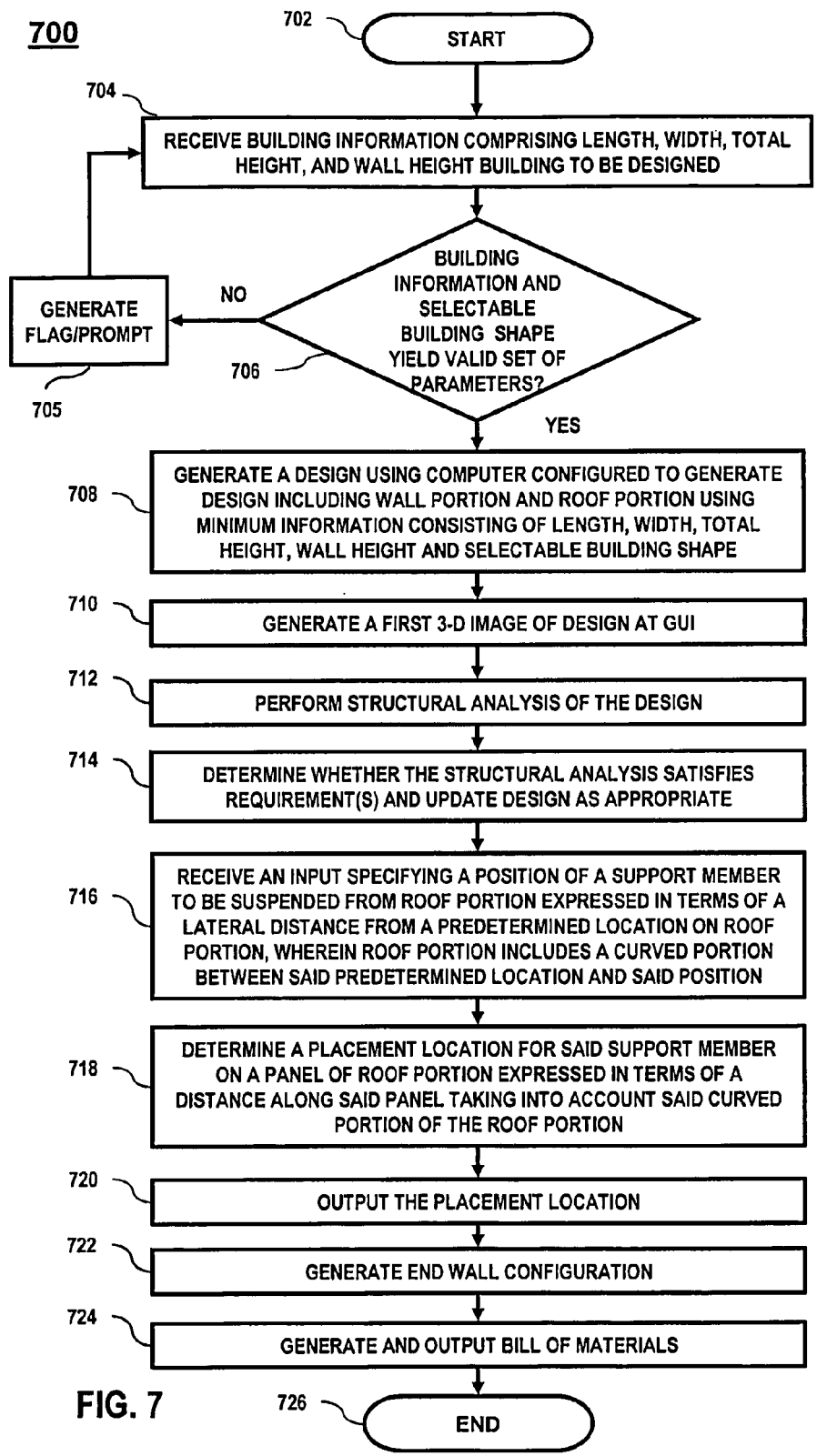
FIG. 7 is a flow chart illustrating an exemplary approach for generating a three-dimensional design of a building according to an exemplary embodiment.

FIG. 7 is a flow chart illustrating an exemplary approach 700 for generating a three-dimensional design of a building according to another exemplary embodiment. Steps 702-716 of FIG. 7 are the same as steps 202-216 of FIG. 2 and need no further description. At step 716 an input from a user is received at the graphical user interface of the computer system 102 specifying a position of a support member (also called a tab for brevity) to be suspended from the roof portion, wherein the position is expressed in terms of a lateral distance from a predetermined location on the roof portion (e.g., from a vertical line intersecting the apex of the building), wherein the roof portion includes a curved portion between the predetermined location and the position at which the tab is to be placed. The tab is configured to support a load (e.g., lights, sprinklers, and heating and ventilation equipment). The location of each tab is determined as a substantially horizontal distance from a fixed point (e.g., the apex of the curved roof).

In exemplary embodiments, the tabs are metal pieces that possess a hook portion like that of the building panels being used and are attached to the individual building panels during construction and crimped into place in between the individual panels. The tabs are generally located a predetermined horizontal distance from a fixed point on the building (e.g., the centerline of the roof).

Figure 8:
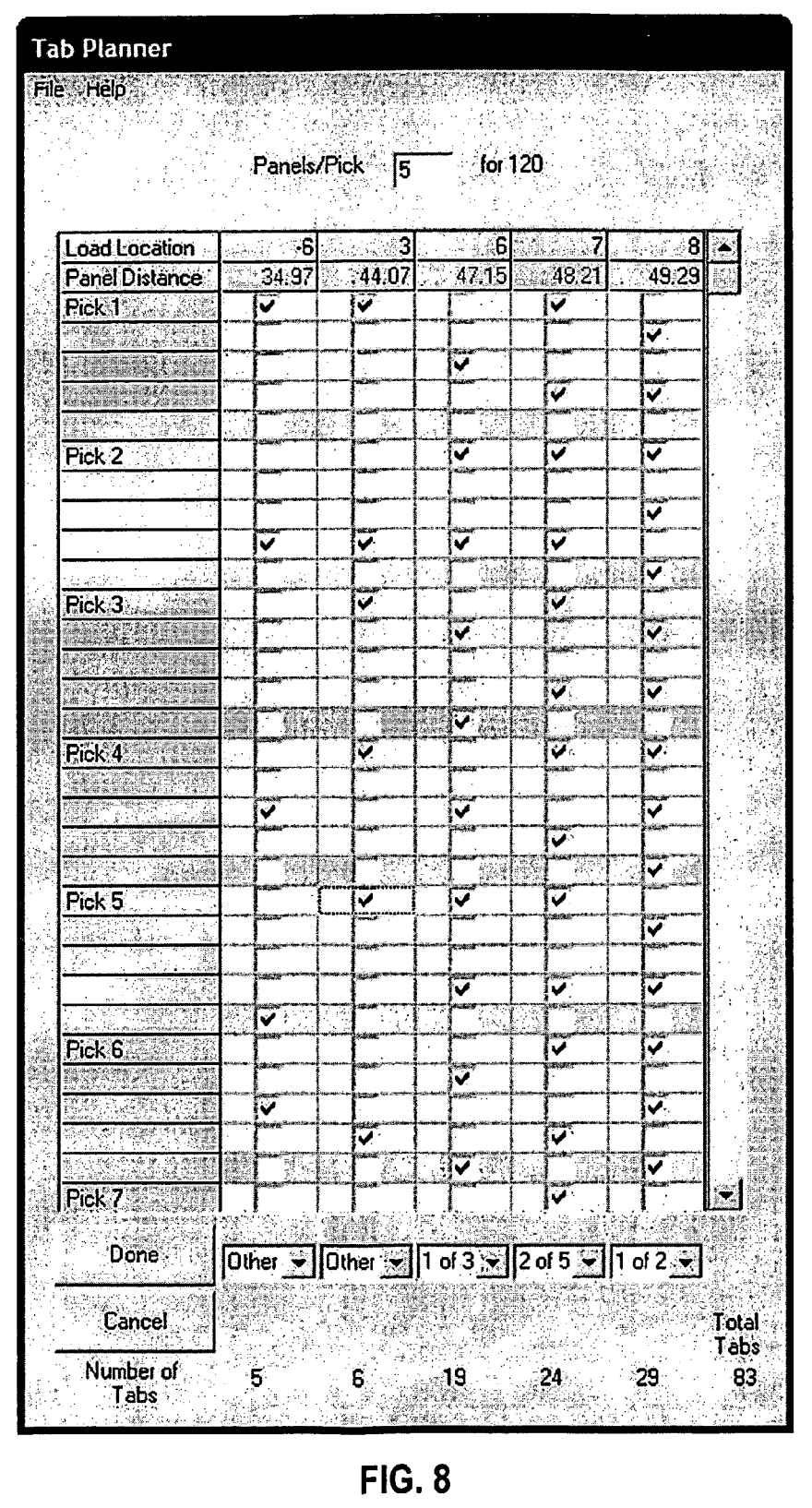

FIG. 8 illustrates an exemplary window of the first GUI for inputting desired lateral tab locations according to an exemplary embodiment. The exemplary GUI window of FIG. 8 allows a user to select tab locations and corresponding panel distance locations. In FIG. 8, the tab locations are linear distances relative to the center of the building (negative values to the left and positive values to the right of the building's center). The panel distances shown are distances along the panel relative to the left end. Although, not shown, in exemplary embodiments, concentrated loads may be listed in a different color than other tab placements. In FIG. 8, the top most text field allows the user to select a grouping of panels (which may be called a pick). From a practical standpoint, a pick is a group of panels that can be connected (seamed) together on the ground and then moved into placed and connected (seamed) to a building under construction. Typical values may be 5 panels/pick for a 120 structure and 3 panels/pick for a 240 structure (the "120" style for a 12-inch wide panel typically being thinner than the "240" style 24-inch wide panel). A user may change these values and the grid illustrated in FIG. 8 may adjust automatically to accommodate the changes. In an exemplary embodiment, the grid is composed of check boxes which are either checked or unchecked representing the placement of a tab. A checked check box for a specific load represents the location of a tab between two panels. In other words, each row of the grid represents a seam between two panels in the building, and each column is a load or tab placement distance. A cross-hatched row represents a seam between two picks in the building. Depending on the size of the building, it may be necessary to scroll down to see all of the picks. Also illustrated in FIG. 8 are combo boxes at the bottom of each column which list several methods for tab placement. For example, selecting "1 of 2" will place 1 tab for every two seams, where selecting "3 of 5" will place 3 tabs for every 5 seams. A user may also create a custom tab scheme or modify an existing one, and the corresponding scheme selection may be listed as "other" or with a user definable name. Additional functionality may also be provided for the convenience of the user. For example, the exemplary GUI window of FIG. 8 could be modified to permit a "select all" or "clear all" functionality to select all check boxes or clear all check boxes of a specific tab. The number of tabs selected for a given load or tab placement is listed at the bottom of each column, and the total number of tabs for the entire building is listed in the bottom right corner under "Total Tabs". Once complete, a user may select the "Done" button at the bottom to accept the changes.

Figure 9:
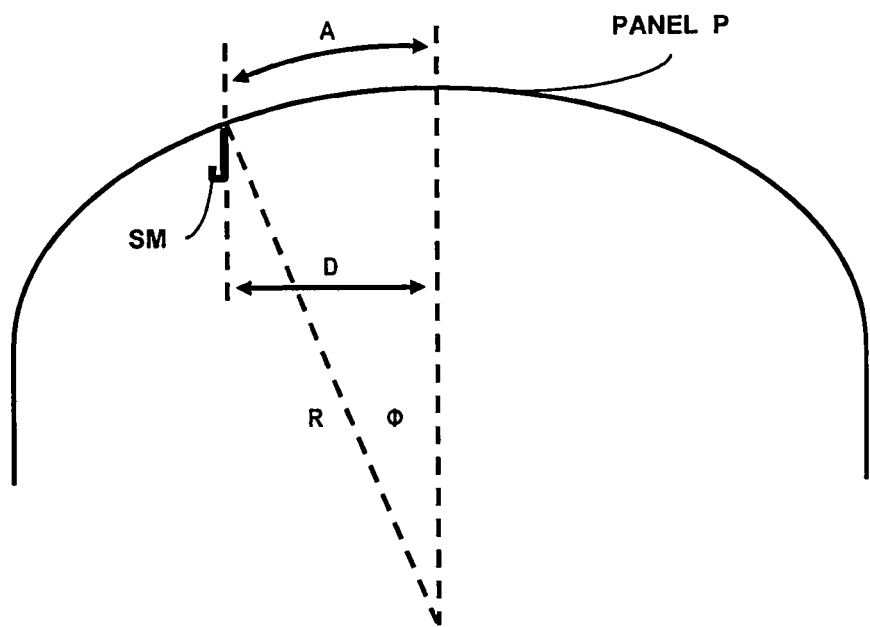
FIG. 9 is a schematic illustrating calculation of a placement location for a support member (tab) according to an exemplary embodiment.

Based on the user input for lateral placement of the tab(s), at step 718 the software module 110 determines a placement location at which to place the tab (more generally, support member) on a panel of the roof portion wherein the placement location is expressed in terms of a distance along said panel taking into account said curved portion of said roof portion. An illustration of information relevant to the calculation is shown in FIG. 9. As discussed above, the tabs are generally located a predetermined horizontal distance from the centerline of the roof. FIG. 9 illustrates how the horizontal distance desired for the tab location is determined in an exemplary embodiment. FIG. 9 illustrates a cross-sectional view of a building design with a curved roof having a radius R in a portion between the roof apex and a support member SM (or tab). The mid-point or centerline of the building in cross-section is indicated by a vertical dotted line. The desired location of the tab is a horizontal distance D from vertical dotted line. If the tab was placed on a flat panel at D units away from the center before the panel is bent into its desired shape by a suitable crimping machine, the resulting tab location would be incorrect, its lateral distance from the vertical center line being less than D due to the curvature of the panel. Therefore, the tab should be placed an arcuate distance A from the centerline so that once the panel is bent, the resulting horizontal distance is D. In an exemplary embodiment, distance A may be determined using the equation $$A = R * \Phi$$

where R is the local radius of the circle in the region of line A; $\Phi = \sin^{-1}(R/D)$; and $\Phi$ is in radians. In addition, if the panel is crimped to have transverse corrugations therein, the support member SM should actually be placed a greater distance than A along the panel to compensate for the additional shortening of the panel due to the presence of the corrugations. One of ordinary skill in the art can make a suitable determination of such distances depending upon the frequency and depth of the corrugations. In other words, the intended presence of transverse corrugations in a curved building panel will require placement of a tab on a panel prior to shaping a distance greater than A in order to have its lateral position arrive at distance D from the vertical centerline. Similar calculations can be performed for other exemplary building shapes, including those that may include panels with straight portions that abut curved portions.

At step 720, the software outputs the placement locations of the tabs, e.g., by displaying them on the display system 130, exporting them to portable memory for input to another device, or by printing them, for example.

The example of FIG. 7 may also utilize a second software module for further visualizing and modifying a building design, such as described in connection with FIG. 2.

Figure 10A:
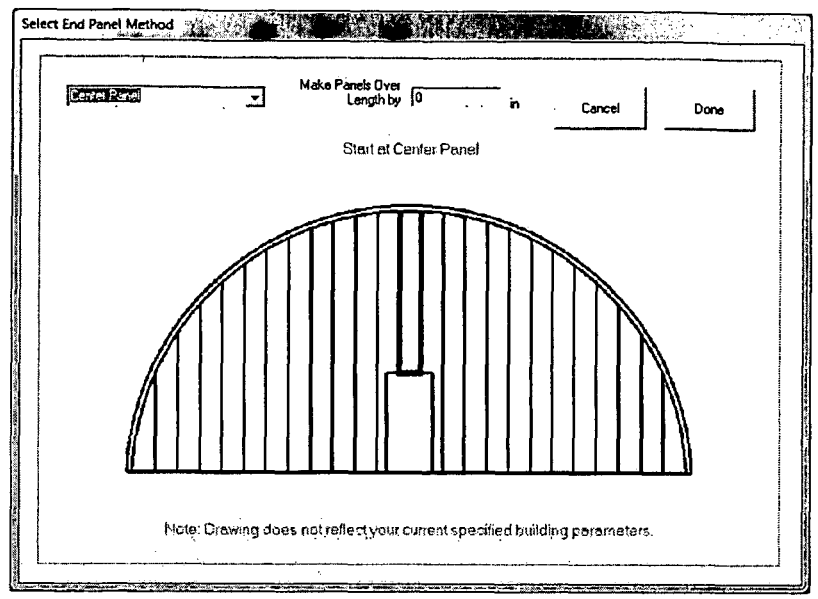
FIGS. 10a-10d are representations of exemplary windows of a graphical user interface for selecting an end panel method according to an exemplary embodiment.
Figure 10B:
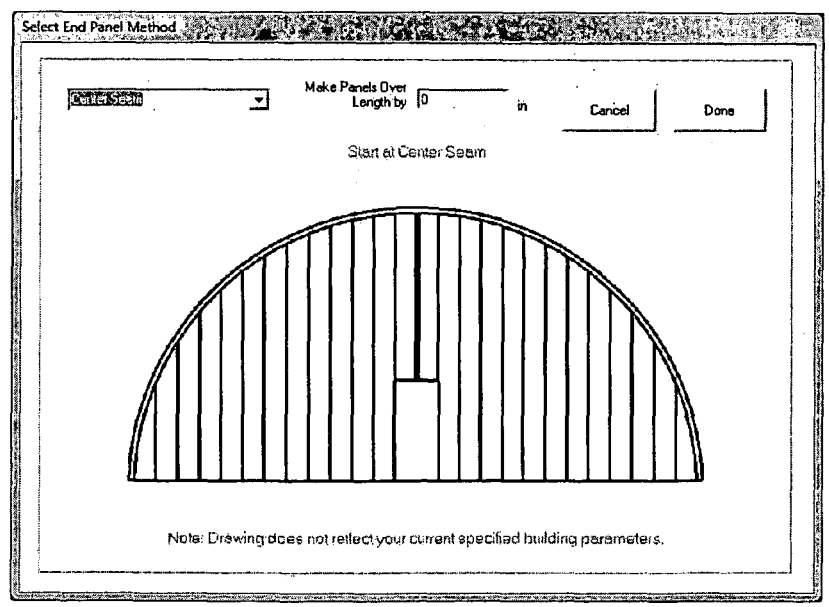
Figure 10C:
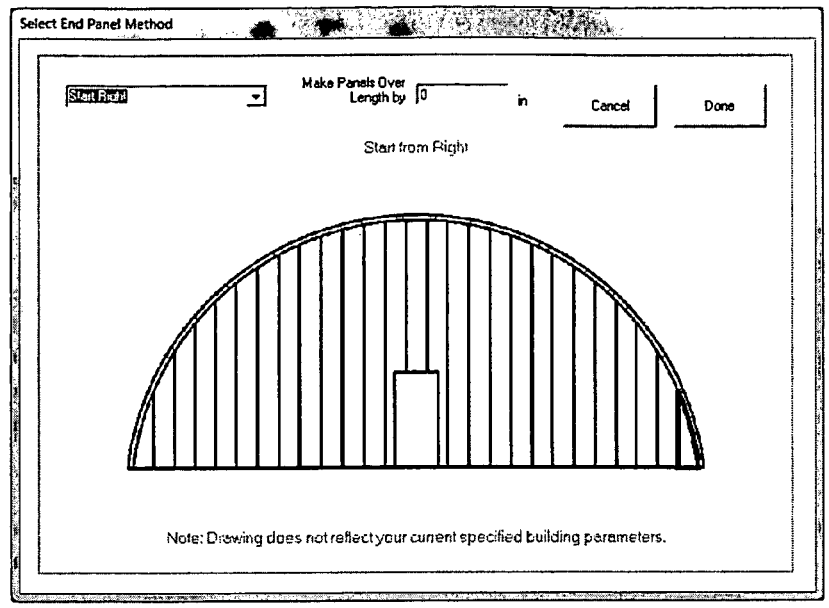
Figure 10D:
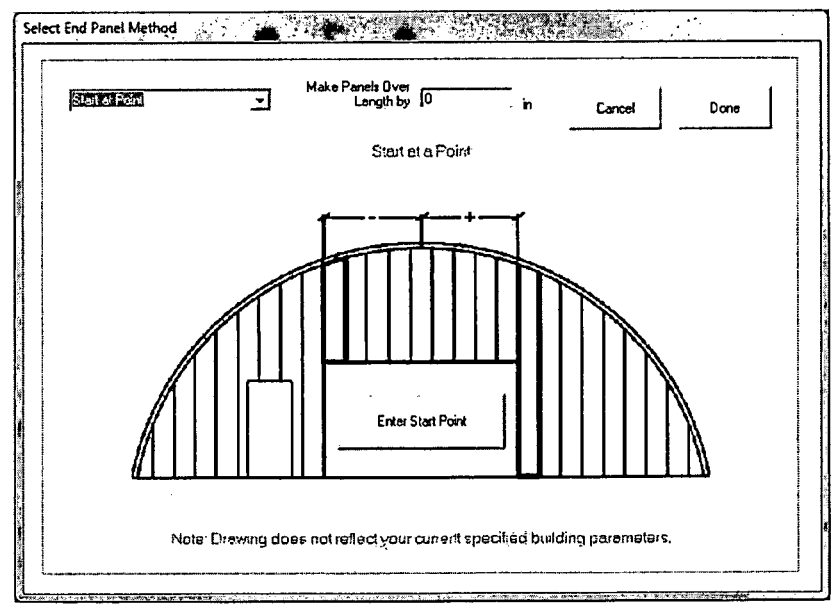

At step 722, the first software module can generate an end wall configuration based on a user selection at the graphical user interface. FIGS. 10a-10d are representations of exemplary GUI windows of the graphical user interface 110 for selecting an end panel method according to an exemplary embodiment. It will be appreciated that building designs described herein may include end walls such as illustrated for example in FIGS. 10a-10d. In exemplary embodiments, a user can select various methods for cutting and placing end panels to generate such end walls. In an exemplary embodiment, the user may instruct the system to automatically determine a "best" method for cutting the panels. In the case of automatic selection, the system may select one of a center panel or a center seam method based, for example, on the economics of the design. FIG. 10a illustrates a center panel method wherein a panel is placed at the center of the building width and the walls are constructed outward from the center panel. FIG. 10b. illustrates a center seam method wherein the seam of two panels is located at the center of the building width. FIGS. 10c and 10d illustrate a start right method and a start at point method, respectively. Of course, all of these exemplary end wall methods can be manually selected by the user. In the start right method, a panel is placed at the right side of the building width and the end panel is built by working toward the left (a start left method may also be implemented). In the start at point method, the user specifies a left and right location from the center of the width and the system builds the end panel in both directions from the selected locations. Additional methods may also be implemented in accordance with the scope of the present invention. The exemplary GUI windows shown in FIGS. 10*a*-10*d* permit a user to select the desired method via a drop down menu shown a the upper left of the windows of FIGS. 10*a*-10*d*.

At step 724, the first software module 110 can generate and output a bill of materials, which includes a listing of the various building materials and components needed for constructing the building, their quantities, and their costs. An exemplary embodiment for generating the bill of materials is explained below with reference to FIGS. 11-13.

Figure 11:
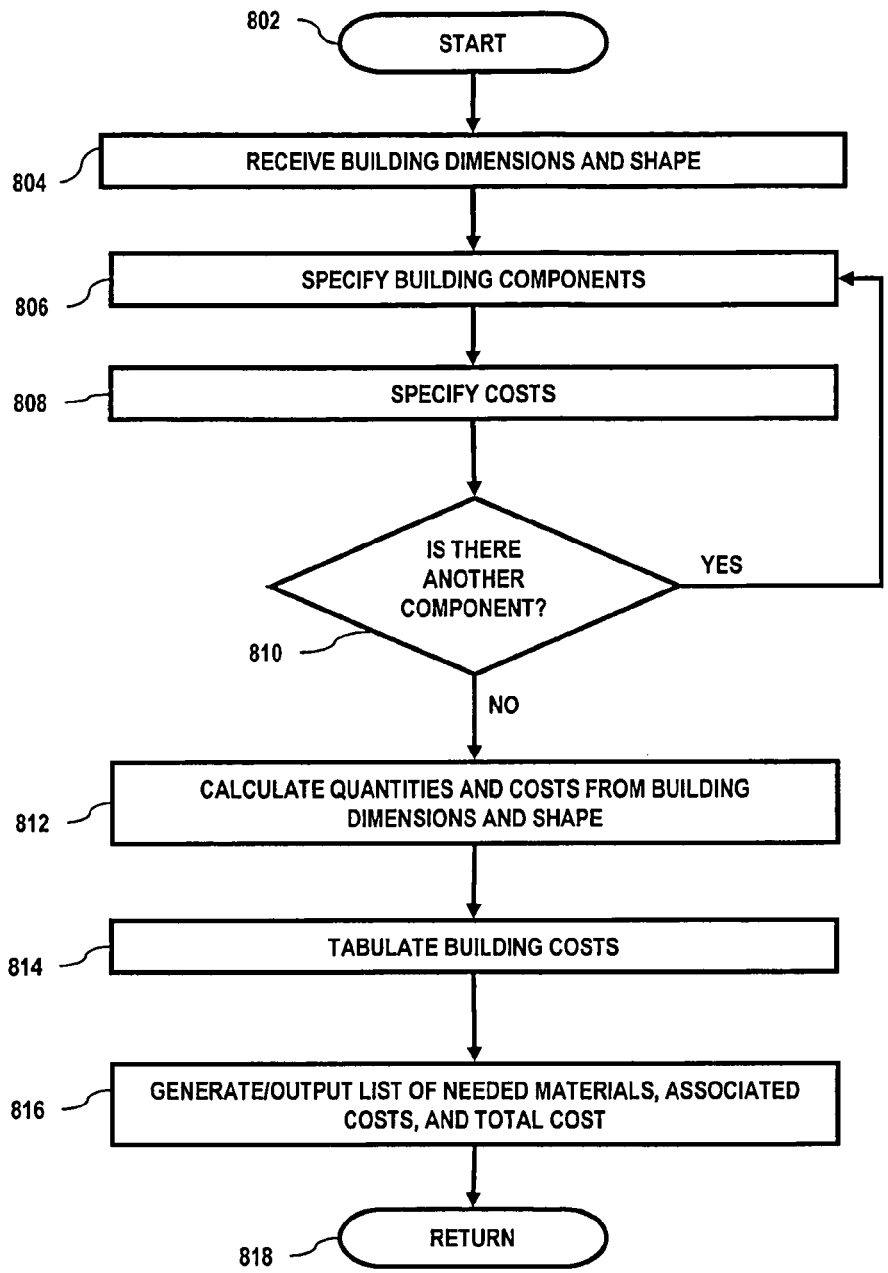
FIG. 11 is a flow chart illustrating an exemplary approach for generating a bill of materials for a building according to an exemplary embodiment.

FIG. 11 is a flow chart illustrating an exemplary procedure for generating a bill of materials for a building design according to an exemplary embodiment. The process starts at step 802 and at step 804 the building dimensions and shape are received from internal memory storage. At step 806, various building components are specified, e.g., by the user. At step 808, approximate unit costs for various components or materials are specified, e.g., by the user, or unit cost values are retrieved from memory. At step 810, the system can determine whether there are any additional components that need to be accounted for. If so, the process will continue to perform steps 806 and 808 until all of the components are accounted for. Once all of the components are specified, the process continues to step 812 where quantities and costs are calculated based on the building dimensions and shape and unit costs. At step 814, a complete list of building materials and components is generated, along with their associated cost, a total cost is generated, and the resulting bill of materials is output, e.g., to the display system 130, a printer, or to memory. The process ends at step 418.

FIG. 12 is a representation of an exemplary GUI window for selecting items to be included in a bill of materials for a building according to an exemplary embodiment. As shown in FIG. 12, a variety of items can be selected or deselected based on user preferences or default values. In general, the selected items are added to the bill of materials. Unit costs can be updated in a suitable table that stores this information, or such cost information can be loaded via portable memory media from building material providers, or such information can be downloaded into memory via the Internet.

FIG. 13 is a representation of a bill of materials for a building according to an exemplary embodiment of the invention. As shown, the bill of materials includes a listing of the required materials, the quantities of the materials and the cost of the various materials. Of particular note in FIG. 13, the bill of materials includes a per square foot cost. In some embodiments, the software module 110 may also generate a concise engineering report that can be submitted to a building code official for approval by the local authority.

Figure 14:
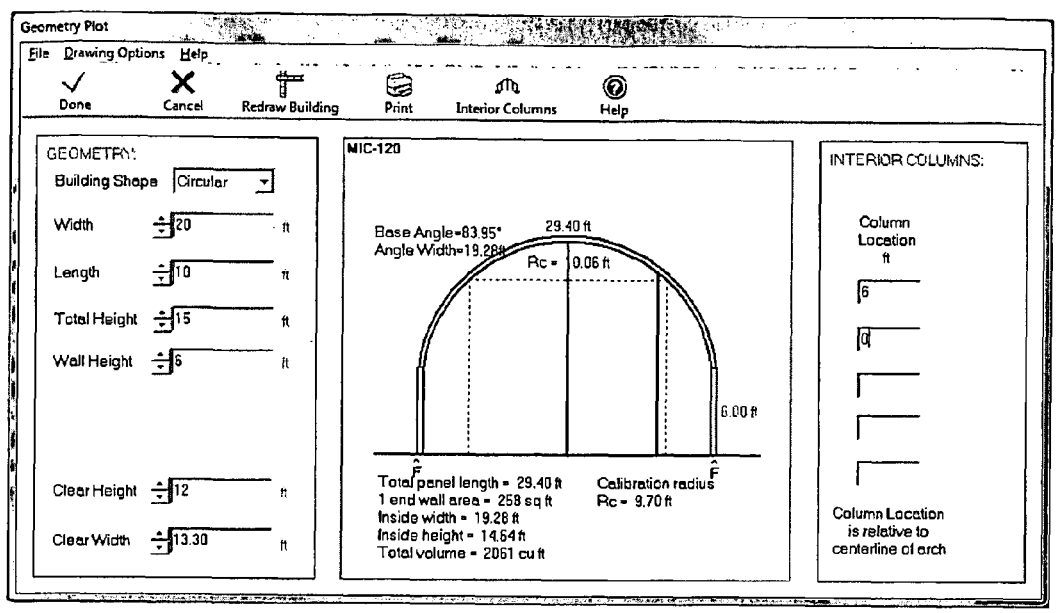
FIG. 14 shows an exemplary window of the first GUI showing an illustration in two dimensions of an exemplary circular style building with support columns and showing associated design parameters.

According to another example, building designs according to the approaches described herein may also include interior support columns and horizontal support beams to further enhance the structural integrity of curved-panel building designs. FIG. 14 illustrates an exemplary embodiment of a geometry plot GUI window with an illustration in two dimensions of an exemplary circular style building and design parameters in which a user can specify interior support columns to assist in supporting curved panel building designs (e.g., wide clear-spanned buildings). The columns may be any type of material such as, for example, AISC "W" shaped columns, and a plurality (e.g., up to five in a typical construction) of such columns may be specified. In the exemplary embodiment of FIG. 14, the positions of the interior support columns are user specified along the building width dimension relative to a predetermined position, e.g., the building arch centerline (the positions may also be computer specified in certain embodiments). The GUI window in FIG. 14 is similar to the GUI window discussed above with reference to FIG. 3*e* except the GUI in FIG. 14 includes a portion of the display for specifying the location of one or more interior support columns. In an exemplary embodiment, locations may be linear distances relative to the center of the building with negative values to the left and positive values to the right. Thus, the methods described herein may include receiving user input specifying a position of an interior support column to be added to the design of the building, and performing the structural analysis of the design with the structural support provided by the support column.

The methods described herein may be implemented utilizing either a software-programmable digital signal processor, or a programmable/hardwired logic device, firmware, or any other combination of hardware, software and firmware sufficient to carry out the described functionality.

In addition, a computer readable medium may include instructions adapted to cause a processing system to carry out the methods described herein. The computer readable medium can be any suitable medium for storing such instructions, such as but not limited to a hard disk, floppy disk, compact disk (CD), digital versatile disk (DVD), magnetic tape, other magnetic or optical storage medium, random access memory (RAM), read only memory (ROM), flash memory, etc. Such instructions may also be embodied in modulated waves/signals (such as radio frequency, audio frequency, or optical frequency modulated waves/signals) that can be downloaded to a computer so as to cause a processing system to carry out the methods described herein.

While the present invention has been described in terms of its preferred embodiment, it will be understood by those skilled in the art that various modifications can be made to the disclosed embodiment without departing from the scope as set forth in the claims.

What is claimed is:

1. A computer-assisted method of automatically generating a design for a self-supporting building that comprises structurally supportive building panels of sheet material, at least some of said building panels including curved sections, and for generating a three-dimensional image of said design, said method comprising:

receiving first building information via a first graphical user interface of a computer, said first building information comprising a length of a building to be designed, a width of said building, a total height of said building and a wall height of said building;

determining with said computer whether said length, said width, said total height, said wall height, and a selectable building shape comprising at least one curved portion yield a valid set of building parameters, said selectable building shape being either computer-specified or user-specified;

if the set of building parameters is valid, generating with said computer a design of said building including self-supporting wall portions and a self-supporting roof portion that do not require structural support posts or beams, using minimum structural information consisting of said length, said width, said total height, said wall height, and said selectable building shape; generating a first image of said design; performing a structural analysis of said design;

determining whether said structural analysis satisfies one or more requirements;

generating with said computer a second image of said building, the second image being a three-dimensional image and being different from the first image; and displaying said second image at a second graphical user interface at said computer, said second user interface configured to permit a user to modify said second image to include one or more predefined building elements.

2. The method of claim 1, further comprising:
receiving at the first graphical user interface of said computer position information specifying a position of a support member to be suspended from the roof portion, said position being expressed in terms of a lateral distance from a predetermined location on said roof portion, said roof portion including a curved portion between said predetermined location and said position;
determining a placement location at which to place said support member on a panel of said roof portion wherein said placement location is expressed in terms of a distance along said panel taking into account said curved portion of said roof portion; and
outputting said placement location at said graphical user interface.

3. The method of claim 1, further comprising generating and outputting a bill of materials for construction of said building.

4. The method of claim 1, wherein said shape comprises a circular shape, a double radius shape, or a gable shape.

5. The method of claim 1, wherein said predefined building elements comprise one or more doors or windows.

6. The method of claim 1, comprising receiving user-selected end wall information at the first graphical user interface for selecting an approach for positioning seams between building panels at an end wall of said design, and generating an end wall configuration based upon the user-selected end wall information.

7. The method of claim 1, comprising receiving user input specifying a position of an interior support column to be added to the design of the building, and performing said structural analysis of the design with the structural support provided by the support column.

8. A system for automatically generating a design for a self-supporting building that comprises structurally supportive building panels of sheet material, at least some of said building panels including curved sections, and for generating a three-dimensional image of said design, said system comprising: a processing system; and a memory coupled to the processing system, wherein the processing system is configured to:
receive first building information via a first graphical user interface, said first building information comprising a length of a building to be designed, a width of said building, a total height of said building and a wall height of said building;
determine whether said length, said width, said total height, said wall height, and a selectable building shape comprising at least one curved portion yield a valid set of building parameters, said selectable building shape being either computer-specified or user-specified;
if the set of building parameters is valid, generate a design of said building including self-supporting wall portions and a self-supporting roof portion that do not require structural support posts or beams, using minimum structural information consisting of said length, said width, said total height, said wall height, and said selectable building shape;
generate a first image of said design;
perform a structural analysis of said design;
determine whether said structural analysis satisfies one or more requirements;
generate a second image of said building, the second image being a three-dimensional image and being different from the first image; and
display said second image at a second graphical user interface, said second user interface configured to permit a user to modify said second image to include one or more predefined building elements.

9. The system of claim 8, the processing system being configured to:
receive at the first graphical user interface position information specifying a position of a support member to be suspended from the roof portion, said position being expressed in terms of a lateral distance from a predetermined location on said roof portion, said roof portion including a curved portion between said predetermined location and said position;
determine a placement location at which to place said support member on a panel of said roof portion wherein said placement location is expressed in terms of a distance along said panel taking into account said curved portion of said roof portion; and
output said placement location at said graphical user interface.

10. The system of claim 8, the processing system being configured to generate and output a bill of materials for construction of said building.

11. The system of claim 8, wherein said shape comprises a circular shape, a double radius shape, or a gable shape.

12. The system of claim 8, wherein said predefined building elements comprise one or more doors or windows.

13. The system of claim 8, the processing system being configured to receive user-selected end wall information at the first graphical user interface for selecting an approach for positioning seams between building panels at an end wall of said design, and generate an end wall configuration based upon the user-selected end wall information.

14. The system of claim 8, the processing system being configured to receive user input specifying a position of an interior support column to be added to the design of the building and to perform said structural analysis of the design with the structural support provided by the support column.

15. An article of manufacture comprising a computer readable storage medium that comprises computer readable program code embodied therein for automatically generating a design for a building that comprises structurally supportive building panels of sheet material, at least some of said building panels including curved sections, and for generating a three-dimensional image of said design, said computer readable program code adapted to cause a processing system to:
receive first building information via a first graphical user interface, said first building information comprising a length of a building to be designed, a width of said building, a total height of said building and a wall height of said building;
determine whether said length, said width, said total height, said wall height, and a selectable building shape comprising at least one curved portion yield a valid set of building parameters, said selectable building shape being either computer-specified or user-specified;
if the set of building parameters is valid, generate a design of said building including self-supporting wall portions and a self-supporting roof portion that do not require structural support posts or beams, using minimum structural information consisting of said length, said width, said total height, said wall height, and said selectable building shape;
generate a first image of said design;

perform a structural analysis of said design;
determine whether said structural analysis satisfies one or more requirements;
generate a second image of said building, the second image being a three-dimensional image and being different from the first image; and
display said second image at a second graphical user interface at said computer, said second user interface configured to permit a user to modify said second image to include one or more predefined building elements.

16. The article of manufacture of claim 15, said computer readable program code adapted to cause a processing system to:
receive at the first graphical user interface position information specifying a position of a support member to be suspended from the roof portion, said position being expressed in terms of a lateral distance from a predetermined location on said roof portion, said roof portion including a curved portion between said predetermined location and said position;
determine a placement location at which to place said support member on a panel of said roof portion wherein said placement location is expressed in terms of a distance along said panel taking into account said curved portion of said roof portion; and
output said placement location at said graphical user interface.

17. The article of manufacture of claim 15, said computer readable program code adapted to cause a processing system to generate and output a bill of materials for construction of said building.

18. The article of manufacture of claim 15, wherein said shape comprises a circular shape, a double radius shape, or a gable shape.

19. The article of manufacture of claim 15, wherein said predefined building elements comprise one or more doors or windows.

20. The article of manufacture of claim 15, said computer readable program code adapted to cause a processing system to receive user-selected end wall information at the first graphical user interface for selecting an approach for positioning seams between building panels at an end wall of said design, and generate an end wall configuration based upon the user-selected end wall information.

21. The article of manufacture of claim 15, said computer readable program code adapted to a cause a processing system to receive user input specifying a position of an interior support column to be added to the design of the building and to perform said structural analysis of the design with the structural support provided by the support column.

22. A computer-assisted method of automatically generating a design for a self-supporting building comprising structurally supportive building panels of sheet material, at least some of said building panels including curved sections, and for generating a three-dimensional image of said design, said method comprising:
receiving first building information via a graphical user interface of a computer, said first building information comprising a length of a building to be designed, a width of said building, a total height of said building and a wall height of said building;
determining with said computer whether said length, said width, said total height, said wall height, and a selectable building shape comprising at least one curved portion yield a valid set of building parameters, said selectable building shape being either computer-specified or user-specified;
if the set of building parameters is valid, generating with said computer a design of said building including self-supporting wall portions and a self-supporting roof portion that do not require structural support posts or beams, using minimum information consisting of said length, said width, said total height, said wall height, and said selectable building shape;
generating an image of said design;
performing a structural analysis of said design;
determining whether said structural analysis satisfies one or more requirements;
receiving at the graphical user interface of said computer an input specifying a position of a support member to be suspended from the roof portion, said position being expressed in terms of a lateral distance from a predetermined location on said roof portion, said roof portion including a curved portion between said predetermined location and said position;
determining a placement location at which to place said support member on a panel of said roof portion wherein said placement location is expressed in terms of a distance along said panel taking into account said curved portion of said roof portion; and
outputting said placement location at said graphical user interface.

23. The method of claim 22, further comprising generating and outputting a bill of materials for construction of said building.

24. The method of claim 22, wherein said shape comprises a circular shape, a double radius shape, or a gable shape.

25. The method of claim 22, wherein said predefined building elements comprise one or more doors or windows.

26. The method of claim 22, comprising receiving user-selected end wall information at the graphical user interface for selecting an approach for positioning seams between building panels at an end wall of said design, and generating an end wall configuration based upon the user-selected end wall information.

27. The method of claim 22, comprising receiving user input specifying a position of an interior support column to be added to the design of the building, and performing said structural analysis of the design with the structural support provided by the support column.

28. A system for automatically generating a design for a self-supporting building that comprises structurally supportive building panels of sheet material, at least some of said building panels including curved sections, and for generating a three-dimensional image of said design, said system comprising:
a processing system; and
a memory coupled to the processing system,
wherein the processing system is configured to:
receive first building information via a graphical user interface, said first building information comprising a length of a building to be designed, a width of said building, a total height of said building and a wall height of said building;
determine whether said length, said width, said total height, said wall height, and a selectable building shape comprising at least one curved portion yield a valid set of building parameters, said selectable building shape being either computer-specified or user-specified;
if the set of building parameters is valid, generate a design of said building including self-supporting wall portions and a self-supporting roof portion that do not require structural support posts or beams, using minimum information consisting of said length, said width, said total height, said wall height, and said selectable building shape;

generate an image of said design;

perform a structural analysis of said design;

determine whether said structural analysis satisfies one or more requirements;

receive at the graphical user interface an input specifying a position of a support member to be suspended from the roof portion, said position being expressed in terms of a lateral distance from a predetermined location on said roof portion, said roof portion including a curved portion between said predetermined location and said position;

determine a placement location at which to place said support member on a panel of said roof portion wherein said placement location is expressed in terms of a distance along said panel taking into account said curved portion of said roof portion; and output said placement location at said graphical user interface.

29. The system of claim 28, the processing system being configured to generate and output a bill of materials for construction of said building.

30. The system of claim 28, wherein said shape comprises a circular shape, a double radius shape, or a gable shape.

31. The system of claim 28, wherein said predefined building elements comprise one or more doors or windows.

32. The system of claim 28, the processing system being configured to receive user-selected end wall information at the graphical user interface for selecting an approach for positioning seams between building panels at an end wall of said design, and generate an end wall configuration based upon the user-selected end wall information.

33. The system of claim 28, the processing system being configured to receive user input specifying a position of an interior support column to be added to the design of the building and to perform said structural analysis of the design with the structural support provided by the support column.

34. An article of manufacture comprising a non-transitory computer readable storage medium that comprises computer readable program code embodied therein for automatically generating a design for a self-supporting building that comprises structurally supportive building panels of sheet material, at least some of said building panels including curved sections, and for generating a three-dimensional image of said design, said computer readable program code adapted to cause a processing system to:

receive first building information via a graphical user interface, said first building information comprising a length of a building to be designed, a width of said building, a total height of said building and a wall height of said building;

determine whether said length, said width, said total height, said wall height, and a selectable building shape comprising at least one curved portion yield a valid set of building parameters, said selectable building shape being either computer-specified or user-specified;

if the set of building parameters is valid, generate a design of said building including self-supporting wall portions and a self-supporting roof portion that do not require structural support posts or beams, using minimum information consisting of said length, said width, said total height, said wall height, and said selectable building shape;

generate an image of said design;

perform a structural analysis of said design;

determine whether said structural analysis satisfies one or more requirements;

receive at the graphical user interface an input specifying a position of a support member to be suspended from the roof portion, said position being expressed in terms of a lateral distance from a predetermined location on said roof portion, said roof portion including a curved portion between said predetermined location and said position;

determine a placement location at which to place said support member on a panel of said roof portion wherein said placement location is expressed in terms of a distance along said panel taking into account said curved portion of said roof portion; and output said placement location at said graphical user interface.

35. The article of manufacture of claim 34, said computer readable program code adapted to cause a processing system to generate and output a bill of materials for construction of said building.

36. The article of manufacture of claim 34, wherein said shape comprises a circular shape, a double radius shape, or a gable shape.

37. The article of manufacture of claim 34, wherein said predefined building elements comprise one or more doors or windows.

38. The article of manufacture of claim 34, said computer readable program code adapted to cause a processing system to receive user-selected end wall information at the graphical user interface for selecting an approach for positioning seams between building panels at an end wall of said design, and generate an end wall configuration based upon the user-selected end wall information.

39. The article of manufacture of claim 34, said computer readable program code adapted to a cause a processing system to receive user input specifying a position of an interior support column to be added to the design of the building and to perform said structural analysis of the design with the structural support provided by the support column.

* * * * *